United States Patent [19]

Trudeau et al.

[11] 4,447,094
[45] May 8, 1984

[54] PRELUBRICATED SEALED BEARINGS

[75] Inventors: William H. Trudeau, Brighton; Donald R. Gaines; Jon M. Smallegan, both of Farmington Hills, all of Mich.

[73] Assignee: O & S Manufacturing Company, Whitmore Lake, Mich.

[21] Appl. No.: 286,471

[22] Filed: Jul. 24, 1981

[51] Int. Cl.³ .............................................. F16C 32/00
[52] U.S. Cl. ..................................... 308/2 R; 403/39
[58] Field of Search ............... 384/145, 146, 206, 207, 384/192, 208, 209, 210; 403/39, 134, 136; 308/2 R, 2 A

[56] References Cited
U.S. PATENT DOCUMENTS 3,339,988  9/1967  Schultze ............................... 384/145
4,034,996  7/1977  Manita et al. ...................... 280/80 R
4,331,367  5/1982  Trudeau et al. .

FOREIGN PATENT DOCUMENTS 1077899  8/1967  United Kingdom .

Primary Examiner—Lenard A. Footland
Attorney, Agent, or Firm—Hauke and Patalidis

[57]  ABSTRACT

A sealed bearing prepacked with lubricant, and provided with a sealing shell press-fitted over the bearing outer member or housing. The sealing shell has a radially disposed end flange holding the terminal flange of a bellows seal made of elastomeric material and having another end in the form of a garter flange resiliently engaged with the peripheral surface of the inner member of the bearing. Preferably, the sealing shell is made of two half-shells, for facility of assembly.

16 Claims, 7 Drawing Figures

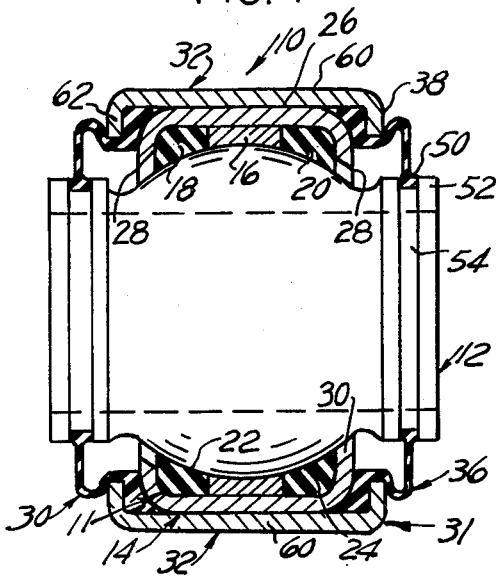
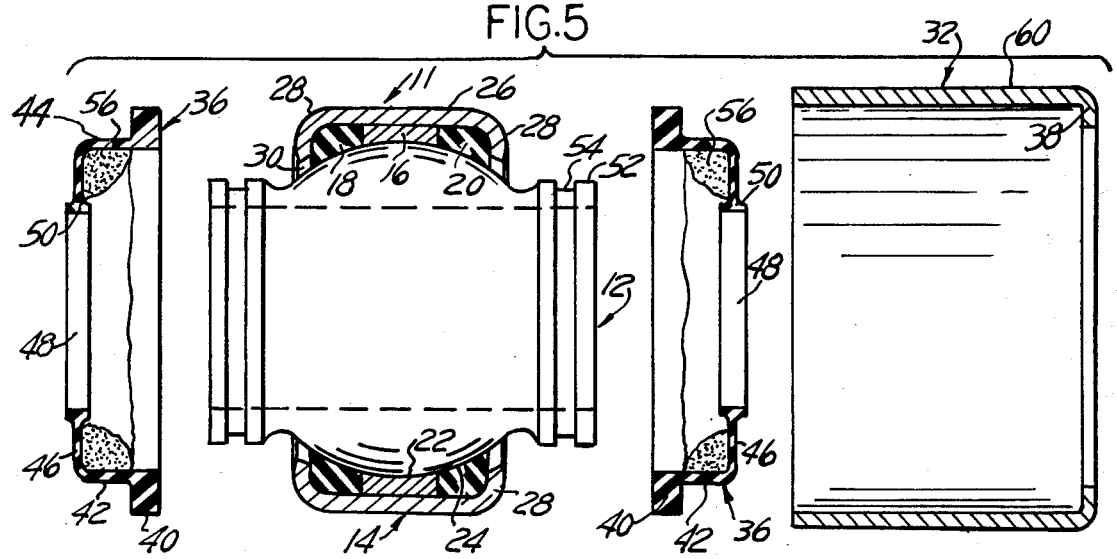
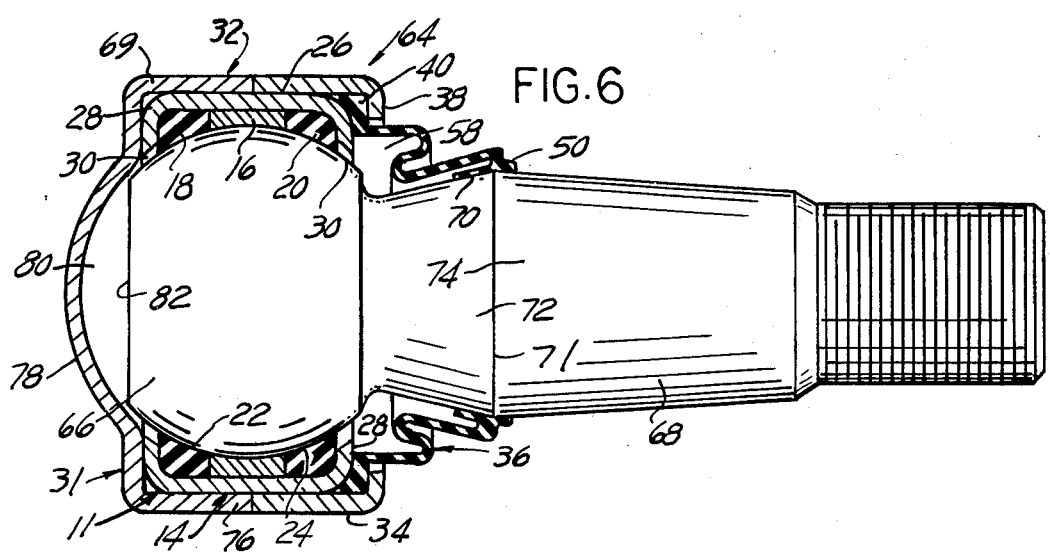

PRELUBRICATED SEALED BEARINGS

BACKGROUND OF THE INVENTION

The present invention relates to bearings in general and more particularly to hermetically sealed prelubricated bearings.

It is desirable to seal bearings such as, for example, spherical bearing units used in the suspension or steering mechanisms of motor vehicles as passenger cars, trucks, trailers, farm tractors and implements, military vehicles, and the like, to prevent the introduction between the bearing surfaces of dirt, dust, water, and other contaminants and abrasive materials, while simultaneously preventing escape to the ambient of a lubricant, such as grease for example, prepacked in the bearing unit.

The task of effectively sealing bearings such as spherical bearings is generally accomplished by wiper seals in the form of flat metallic or plastic washers having line contact with the spherical or cylindrical peripheral surface of the bearing inner member. Wiper seals require that their wiping edge be constantly biased against the bearing inner member peripheral surface and that they be installed within the bearing unit during assembly of the diverse components of the bearing. Wiper seals are subject to rapid wear and to damage that cause their sealing capability to rapidly deteriorate, and they leave a substantial area of the bearing surfaces exposed to the ambient, with the result that when a spherical bearing is angulated an exposed and contaminated surface is brought in contact with the wiper seal edge, thus directly participating into damaging and destroying the sealing ability of the wiper seal and carrying dirt and contaminants between the bearing surfaces in engagement. Furthermore, as the wiper seals gradually deteriorate, the lubricant gradually seeps to the ambient, and the lack of insufficiency of lubrication accelerates the damaging effect.

The present invention remedies the disadvantages of the prior art by providing a hermetically sealed bearing, more particularly spherical bearing, lubricated for life, and in which the elements providing the sealing functions are separate from the element accomplishing the bearing functions, but in which, nevertheless, the functions are incorporated in an integral single unit.

SUMMARY OF THE INVENTION

The principal object of the invention is to provide a single unit pre-lubricated bearing, such as a spherical bearing, requiring a minimum of parts, which is relatively easy to manufacture, and in which the sealing functions do not interfere with the bearing functions, in which the bearing surfaces are efficiently sealed from the ambient, and providing a leakproof enclosure for the lubricant prepacked in the unit.

These objects, and other objects and advantages of the present invention, will become apparent to those skilled in the art when the following description of the best mode contemplated for practicing the invention is read in conjunction with the accompanying drawing wherein like reference numbers refer to like or equivalent elements and in which:

BRIEF DESCRIPTION OF THE DRAWING

FIG. 4 is a view similar to FIG. 2 but showing a modification thereof;

FIG. 5 is an exploded view of the modification of FIG. 4; and

FIG. 6 is a view similar to FIG. 2, but illustrating a modification in the form of a hermetically sealed ball-stud and socket spherical bearing.

DETAILED DESCRIPTION OF THE PREFERRED EMBODIMENTS

Figure 1:
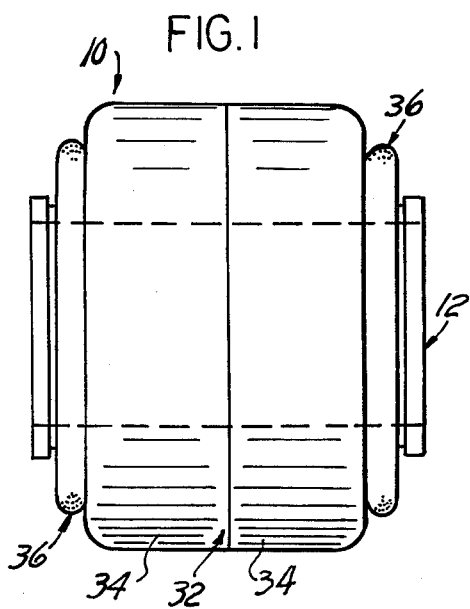
FIG. 1 is an elevation view of an example of hermetically sealed bearing according to the present invention.
Figure 2:
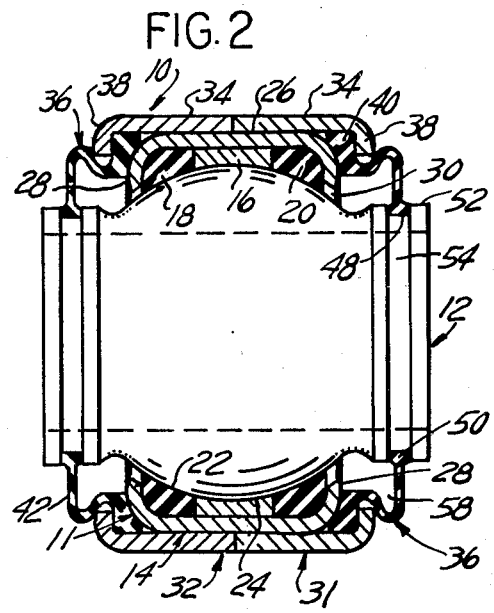
FIGS. 2 and 2A are longitudinal sections therethrough.
Figure 3:
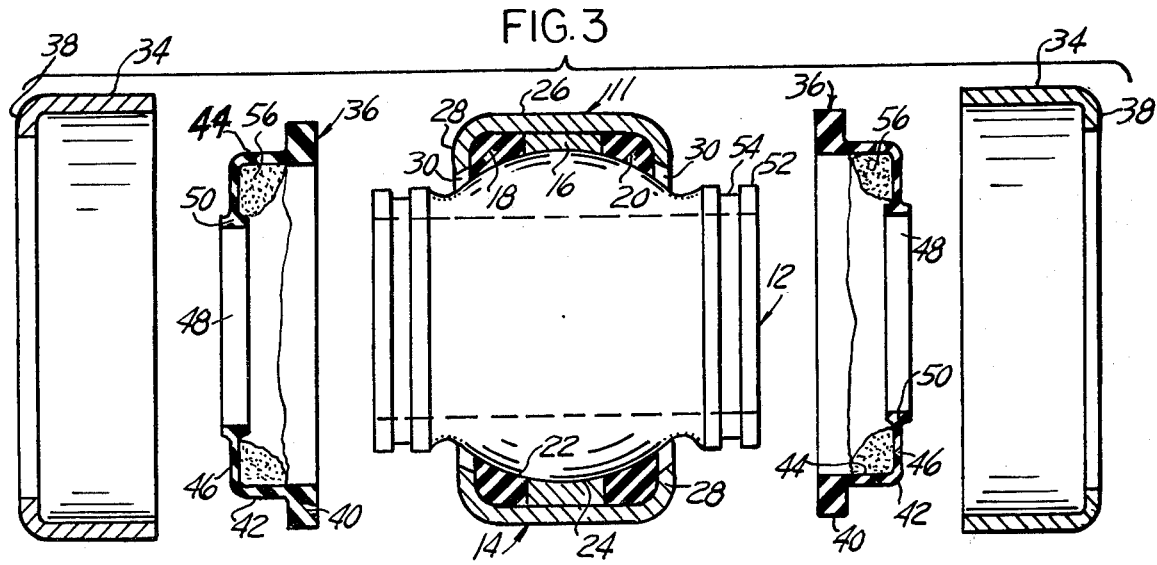
FIG. 3 is an exploded view thereof.

Referring to the drawing and more particularly to the structure illustrated at FIG. 1, and in more details at FIGS. 2 and 3, a sealed spherical bearing unit 10 according to the invention comprises a bearing unit 11 having an inner member which, in the example of structure illustrated, is in the form of a hollow ball sleeve 12 disposed within a socket having a housing or shell 14. Load carrying bearing members are disposed in the shell 14, in the form of a central solid metallic or plastic ring 16, split such as to be momentarily elastically enlarged for assembly over the hollow ball sleeve 12, and a pair of symmetrically disposed elastomeric plastic lateral or end rings 18 and 20. The central ring 16 and the end rings 18 and 20 form a concave spherical bearing surface 22 in swivelling engagement with the convex spherical surface 24 of the hollow ball sleeve 12. It will be readily appreciated that the structure of the bearing unit 11 is given for illustrative purpose only, and that other structures may be adopted, such as bearing units having cylindrical bearing surfaces for example, without detracting from the purview of the invention.

Figure 2A:
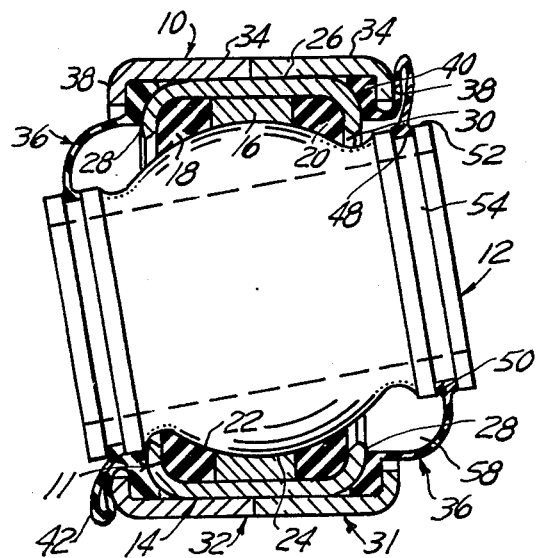

The shell 14 has a cylindrical peripheral surface 26, and two integral radially disposed end flanges 28, one of which may be preformed when the shell 14 is drawn in the general form of a cup, or after the shell 14 is cut from a length of metallic tubing. The other end flange 28 is formed by swaging, during assembly of the bearing unit 11. The edge of the end flanges 28 forms with the spherical surface 24 of the hollow ball sleeve 12 an annular clearance space or gap 30 allowing free swivelling of the hollow ball sleeve 12 relative to the shell 14, up to the limit resulting from engagement of a portion of the edge of an end flange 28 with a portion of the peripheral surface of the hollow ball sleeve 12, as illustrated at FIG. 2A. Leaving the annular gap 30 without any sealing means would allow dirt and contaminants to be introduced between the bearing surfaces 22 and 24 and would present a wide exit path to any lubricant prepacked in the bearing unit 11.

The invention provides encapsulating the whole bearing unit 11 in a hermetically sealed enclosure 31 consisting of a peripheral second shell 32, preferably made of a pair of identical half shells 34, press-fitted over the bearing unit shell 14, and provided with flexible elastic bellows end seals 36 made of elastomeric material such as natural or synthetic rubber, polyurethane or the like. Each of the half shells 34 has an integrally formed radially directed end flange 38, spaced apart from the end flange 28 of the bearing shell 14, each of the bellows seals 36 having a corresponding integral annular end flange 40 which is compressibly held between the exterior surface of the bearing shell end flange 28 and the inner surface of the sealing half shell end flange 38 when each half shell 34 is press-fitted over the bearing shell 14. Each of the bellows seals 36, prior to installation, is generally of the form illustrated in the exploded view of FIG. 3. Each bellows seal 36 has a relatively thin-walled body portion 42 which in its free state, FIG. 3, is generally cup-shaped with a longitudinal cylindrical portion 44 and a transverse radial annular portion 46 terminating in a lipped or flanged opening 48 defined by a longitudinal flange or lip 50 functioning as a garter-like integral flange member elastically encircling the periphery of the hollow ball sleeve 12, FIGS. 2 and 2A, around a cylindrical end portion 52 thereof. As the opening 48 within the garter flange 50 of the bellows seal 36 has a diameter substantially less than the outer diameter of the cylindrical end portion 52 of the hollow ball sleeve 12, the garter flange 50 is elastically enlarged and applies considerable pressure upon the peripheral surface of the cylindrical end portion 52 of the hollow ball sleeve, thus providing a hermetic, but flexible joint between the interior of the sealing unit 31 containing the bearing unit 11 and the ambient. The cylindrical end portion 52 of the hollow ball sleeve 12 is preferably provided with an annular groove 54 receiving the bellows seal garter flange 50. The end bellows seals 36, prior to assembly, are prepacked, as shown at 56 at FIG. 3, with an appropriate quantity of lubricant such as a high temperature water-resistant grease which, after assembly, is safely contained within the space 58 existing behind each end bellows seal 36.

The sealing unit 31 is susceptible of modifications, an example of which is illustrated at FIGS. 4–5. In the example of structure illustrated, the shell 32 of the sealing unit 31 is made of a single piece cylindrical shell member 60 provided at one end with a bellows seal retainer flange 38, FIG. 5. The shell member 60 is press-fitted over the bearing unit 11 with the corresponding end bellows seal 36 installed in position and held between the end flange 28 of the bearing unit shell 14 and the seal retaining end flange 38 of the shell member 60. The second end seal 36 is then installed in its position with its thick flange 40 in engagement with the other end flange 28 of the bearing unit shell 14, and the rim of the shell member 60 is swaged, FIG. 4, such as to form a retaining flange 62 for the second end seal 36.

It will be readily apparent to those skilled in the art that the sealed bearing 10 of FIGS. 1–5 is of the type allowing a swivelling connection between a member mounted through the bore in the hollow ball sleeve 12 and a member encircling the periphery of the outer shell 32 of the sealing unit 31. The principles of the invention, however, are applicable to a variety of swivel or knuckle joints of the ball and socket type, such as the knuckle joint 64 illustrated at FIG. 6. In the knuckle joint 64, the inner member of the bearing unit 11 is a ball 66 provided with an integral stud 68 projecting through one end of the bearing unit socket shell 14. The bearing unit 11 is hermetically sealed by a sealing unit 31 comprising a shell 32 formed of a cylindrical half shell 34 and a cup-shaped half shell 69, press-fitted over the bearing unit shell 14. The cylindrical half shell 34 is provided with an end flange 38 for pressurably capturing the thick end flange 40 of the bellows seal 36 between the interior surface of the end flange 38 and the exterior surface of the bearing unit shell end flange 28. The seal garter flange 50 has a substantially V-shaped surface 70 which encircles a portion of the stud 68 at the junction 71 between two inversely tapered cylindrical surfaces 72 and 74 of the stud, thus providing a non-slipping junction between the seal garter flange 50 and the peripheral surface of the stud 68. Prior to installation of the bellows seal 36, an appropriate lubricant, high temperature water-resistant grease for example, is used to pack the space 58 behind the seal.

The sealing unit cup-shaped half shell 69 has a cylindrical body portion 76, press-fitted over the bearing unit shell 14 and provided with a domed integral end wall 78 interiorly forming a clearance space 80 for the stud ball portion 66 during swivelling of the stud 68 relative to the bearing socket shell 14. The ball 66 has a flat end surface 82 such that the clearance space 80 is actually formed between the ball flat end face 82 and the inner surface of the dome portion 78 of the cup-shaped half shell 69. The space 80 is prepacked with a lubricant, such as grease, prior to press-fitting the end cap 69 over the bearing unit shell 14.

It will be appreciated by those skilled in the art that the present invention has applications to hermetically sealed bearings other than the spherical bearings herein shown and described for illustrative purposes not intended to limit the scope of the invention.

Having thus described the present invention by way of structural examples thereof, modifications whereof will be apparent to those skilled in the art, what is claimed as new is as follows:

1. A hermetically sealed bearing consisting of a sealing unit and a bearing unit in assembly, said bearing unit comprising an inner member, a housing disposed around said inner member, a load-carrying bearing member disposed between said housing and said inner member and defining bearing surfaces between said inner member and said housing, and a substantially radially disposed end flange at an end of said housing, said inner member having a portion projecting from at least said one end of said housing, and said sealing unit comprising a separate shell press-fitted over said bearing unit housing, a substantially radially disposed end flange at an end of said shell, an elastomeric bellows seal having an end flange compressibly retained between said end flange of said shell and said end flange of said bearing housing, a garter flange integrally formed at the other end of said bellows seal, said garter flange forming an opening of a diameter substantially smaller than the diameter of the projecting portion of said inner member for elastically encircling a circumferential area of said projecting portion, and means hermetically sealing the other end of said shell.

2. The bearing of claim 1 wherein a lubricant is contained in a space formed between said bearing housing end flange and said bellows seal.

3. The bearing of claim 2 wherein said bearing inner member has portions projecting each from an end of said housing and wherein said shell has a substantially radially disposed end flange at each end of said shell, and said means hermetically sealing the other end of said shell comprises a substantially radially disposed end flange at the other end of said shell, a second elastomeric bellows seal having an end flange compressibly retained between said second end flange of said shell and a corresponding end flange of said bearing housing and a garter flange integrally formed at the other end of said bellows seal, said garter flange forming an opening of a diameter substantially smaller than the diameter of the corresponding projecting portion of said inner member for elastically encircling a circumferential area of said projecting portion.

4. The bearing of claim 3 wherein said shell is made of two identical portions, each press-fitted over said bearing housing from each end thereof, each of said shell portions retaining one of said bellows seal.

5. The bearing of claim 4 wherein a lubricant is contained in a space formed between said bearing housing end flange and said second bellows seal.

6. The bearing of claim 3 wherein a lubricant is contained in a space formed between said bearing housing end flange and said second bellows seal.

7. The bearing of claim 2 wherein said shell is made of two portions each press-fitted over said bearing housing, one of said portions retaining said bellows seal and the other being provided with said means hermetically sealing the other end of said shell.

8. The bearing of claim 2 wherein said bearing inner member has a portion projecting from a single end of said housing and the means hermetically sealing the other end of said shell has an end wall.

9. The bearing of claim 8 wherein said end wall is shaped such as to form an interior space containing a lubricant.

10. The bearing of claim 1 wherein said bearing inner member has a portion projecting from a single end of said housing and the means hermetically sealing the other end of said shell has an end wall.

11. The bearing of claim 10 wherein said end wall is shaped such as to form an interior space containing a lubricant.

12. The bearing of claim 11 wherein said shell is made of two portions each press-fitted over said bearing housing, one of said portions retaining said bellows seal and the other being provided with means hermetically sealing the other end of said shell.

13. The bearing of claim 10 wherein said shell is made of two portions each press-fitted over said bearing housing, one of said portions retaining said bellows seal and the other being provided with means hermetically sealing the other end of said shell.

14. The bearing of claim 1 wherein said shell is made of two portions each press-fitted over said bearing housing, one of said portions retaining said bellows seal and the other being provided with said means hermetically sealing the other end of said shell.

15. The bearing of claim 1 wherein said bearing inner member has portions projecting each from an end of said housing and wherein said shell has a substantially radially disposed end flange at each end of said shell, and said means hermetically sealing the other end of said shell comprises a substantially radially disposed end flange at the other end of said shell, a second elastomeric bellows seal having an end flange compressibly retained between said second end flange of said shell and a corresponding end flange of said bearing housing and a garter flange integrally formed at the other end of said bellows seal, said garter flange forming an opening of a diameter substantially smaller than the diameter of the corresponding projecting portion of said inner member for elastically encircling a circumferential area of said projecting portion.

16. The bearing of claim 15 wherein said shell is made of two identical portions, each press-fitted over said bearing housing from each end thereof, each of said shell portions retaining one of said bellows seal.

* * * * *